Oct. 13, 1936.   W. J. WESSELER   2,057,074
METHOD AND APPARATUS FOR MAKING CAST METAL ARTICLES
Filed Oct. 24, 1932   4 Sheets-Sheet 1
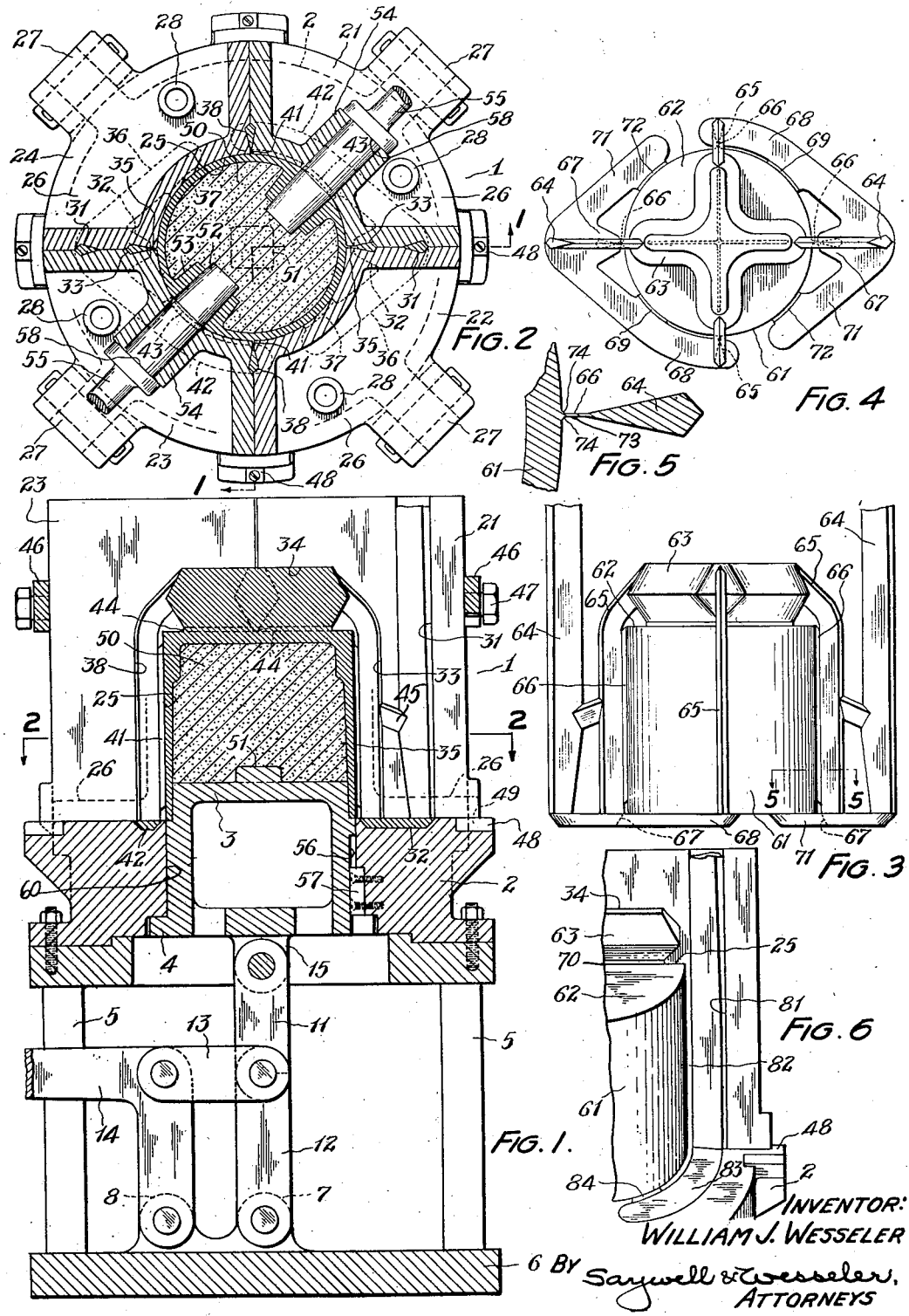
INVENTOR:
WILLIAM J. WESSELER
BY Sarywell & Wesseler,
ATTORNEYS

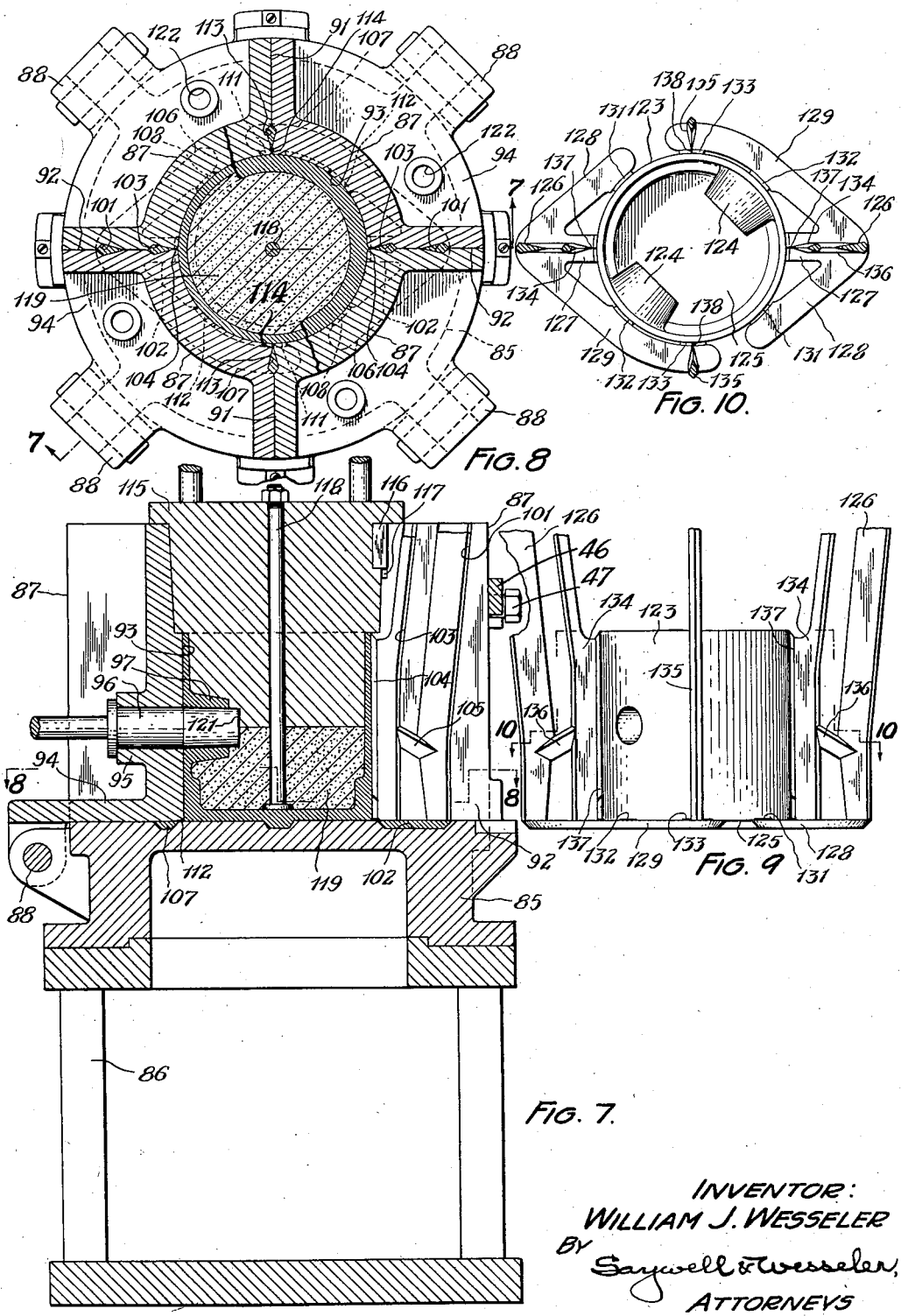

Oct. 13, 1936.  W. J. WESSELER  2,057,074
METHOD AND APPARATUS FOR MAKING CAST METAL ARTICLES
Filed Oct. 24, 1932  4 Sheets-Sheet 3

INVENTOR:
WILLIAM J. WESSELER
BY Saywell & Wesseler,
ATTORNEYS.

Oct. 13, 1936.　　　W. J. WESSELER　　　2,057,074
METHOD AND APPARATUS FOR MAKING CAST METAL ARTICLES
Filed Oct. 24, 1932　　　4 Sheets-Sheet 4
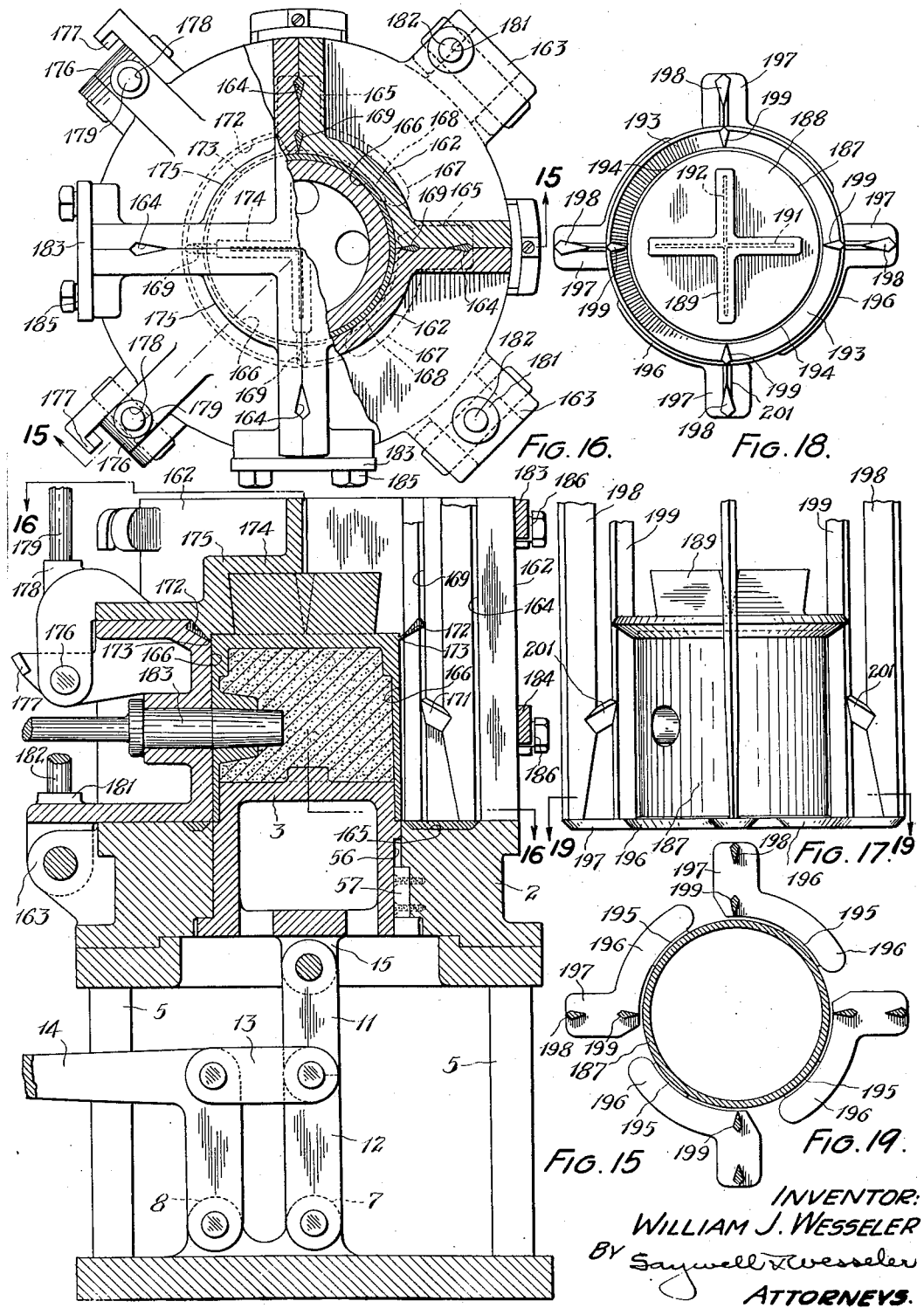

Patented Oct. 13, 1936

2,057,074

UNITED STATES PATENT OFFICE 2,057,074

METHOD AND APPARATUS FOR MAKING CAST METAL ARTICLES

William J. Wesseler, East Cleveland, Ohio, assignor to The National Bronze & Aluminum Foundry Company, Cleveland, Ohio, a corporation of Ohio Application October 24, 1932, Serial No. 639,231

7 Claims. (Cl. 22—209)

This invention, as indicated, relates to cast metal articles and method and apparatus for making the same. More particularly it comprises a method of forming articles in molds, especially in permanent or semi-permanent molds, by supplying metal to the article or articles being cast througn one or more thin elongated passageways contacting with the surface of the article above the base of the casting cavity or at the lower periphery thereof and forming gates of such a degree of thinness that no material distortion or draws are imposed or impressed on the surface of the article, whereby such gates are readily frangible, and the article is free for machining or polishing without sawing or grinding operations in most instances, and with a minimum of finishing operations in any event.

This invention comprises improvements on the casting method and apparatus of John Schmeller, Sr., Serial No. 589,068, which has been allowed as U. S. Patent No. 1,885,039, under date of October 25, 1932. It also embodies certain improvements in gating comprising in combination with other elements, particularly very narrow passageways, features disclosed in Hardin Patent No. 1,019,248, March 5, 1912.

The article illustrated in the present case comprises a piston, but the invention is not intended to be limited to such structure as many articles, whether machine parts or strictly ornamental articles, such as metal statuettes, or the like, may be made with equal facility and without surface imperfections which would interfere with their use or sale.

The principal object of the present invention is to provide a mold adapted to carry out a novel method of manufacture to produce cast articles, by supplying metal to the casting cavity through narrow elongated gates positioned at any desired places about the outer surface of the article to be cast, and includes the production of castings particularly those for pistons, and especially those formed of aluminum or similar metals, or alloys thereof, which, without sawing or grinding operations, are ready for machining, polishing, and like operations.

Another object of the invention is to provide a mold wherein all the metal reaching the casting cavity enters the same through a plurality of narrow elongated passageways, each supplying a relatively small amount of metal, but being increased in number in proportion to the amount of metal required, and because of their non-distortion of the casting by reason of the valve-like action of the gates being adapted to be positioned at any point over the outer surface of the article being cast without interfering with its subsequent machining or finishing. These gates may be substantially parallel to each other. The passageways for the gates may extend vertically or horizontally and upon the opening of the mold, the casting may be readily freed from all sprues and runners through the fracturing of the gates closely adjacent the casting surfaces.

A further object of the invention is to provide a mold having a readily withdrawable core section and to provide for the use of semi-permanent core sections for use therewith.

Another object of the invention is to provide a riser in connection with the head section of a piston mold which will insure uniformity of metal density and texture in the heavier top wall of the piston.

Another object of the invention is to provide for the casting of pistons preferably from aluminum or aluminum alloys in either head up or head down position without disturbing the uniformity of the metal distribution and at the same time permitting the casting to be immediately released from all auxiliary metal gates and sprues and runners upon removal from the molds, and sharply tapping the adherent metal adjacent the thin frangible gates.

Other and further objects of the invention will appear in the course of the following description.

The annexed drawings and the following description set forth in detail certain means and modes of carrying out the invention, and the product resulting therefrom, such disclosed means, mode, and product illustrating, however, but several of various applications of the principle of the invention.

In said annexed drawings:

Figure 1 is a vertical sectional view, taken along the line 1—1, shown in Figure 2, looking in the direction of the arrows;

Figure 2 is a sectional plan view, taken along the line 2—2, shown in Figure 1, looking in the direction of the arrows;

Figure 3 is an elevation of the casting produced in a mold corresponding to Figures 1 and 2;

Figure 4 is a plan view of the casting shown in Figure 3;

Figure 5 is a greatly enlarged sectional view of a vertical gate and adjacent structure, as seen along the line 5—5, shown in Figure 3, looking in the direction of the arrows;

Figure 6 is a fragmentary perspective view showing a modified form of construction wherein a sprue and horizontal runners are provided and thin gates connecting said elements with the casting cavity at each parting plane of the mold sections;

Figure 7 is a vertical sectional view of a modified form of mold construction, taken along the line 7—7, Figure 8, wherein the piston is cast in head down position;

Figure 8 is a sectional plan view, taken along the line 8—8, shown in Figure 7, looking in the direction of the arrows;

Figure 9 is an elevation of the casting produced in a mold corresponding to Figures 7 and 8;

Figure 10 is a plan view of the casting shown in Figure 9;

Figure 15 is a vertical sectional view showing a still further modified form of construction embodying a multi-part mold having double hinged cope sections and circumferential metal feeding passageways, taken along the line 15—15, shown in Figure 16, looking in the direction of the arrows;

Figure 16 is a sectional plan view, taken along the line 16—16, shown in Figure 15, looking in the direction of the arrows;

Figure 17 is an elevation of a casting produced in a mold corresponding to Figures 15 and 16;

Figure 18 is a plan view of the casting shown in Figure 17; and

Figure 19 is a bottom plan view, partly in section, showing the gate structure of the mold shown in Figures 15 to 18, inclusive.

Figures 12, 14:
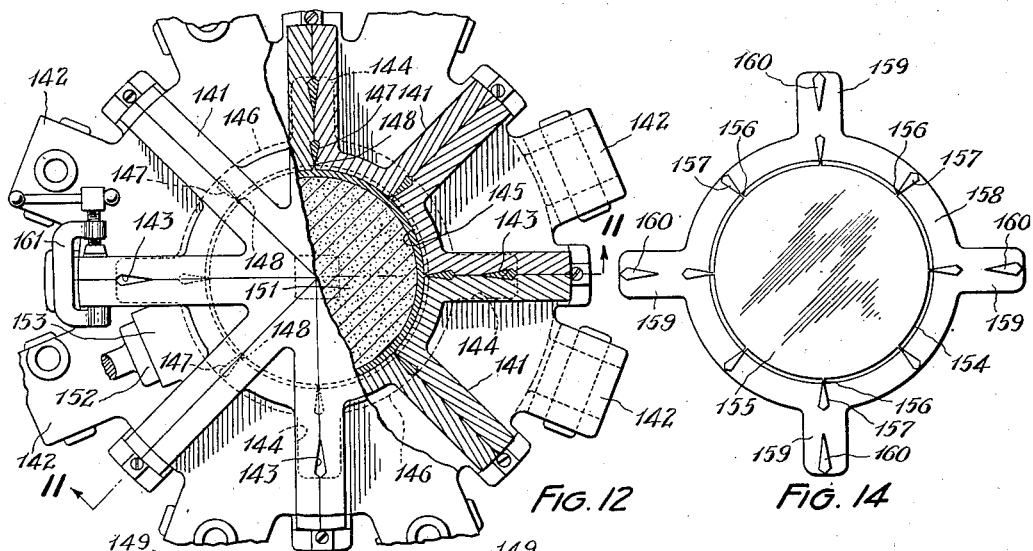
Figure 12 is a sectional plan view, taken along the line 12—12, shown in Figure 11, looking in the direction of the arrows.
Figure 14 is a plan view of the casting shown in Figure 13.

A number of different forms of construction are illustrated in the drawings, the preferred form of construction being shown in Figures 1 to 5. Said construction embodies a multi-part mold 1 having a base member 2 in the form of a plate centrally apertured to receive a removable core 3 formed of a hollow cylindrical metal member provided with an integral flange extension 4 at its lower peripheral margin. The plate is supported upon standards 5 at each of the four corners, secured at their lower ends to a floor plate 6. The floor plate on its upper surface is provided with a pair of upstanding ears 7, 8, one positioned centrally thereof and forming a pivot member for a toggle comprising the links 11, 12, joined centrally by a pivot pin to a short link 13 pivoted to the angle of a bell crank lever 14 which is pivotally supported at its lower end upon the upstanding ear 8. The upper toggle link 11 is pivotally connected to an ear 15 provided centrally of the under side of the movable core member. The links 11 and 12 lock on shoulders slightly past dead center.

The mechanism just described is adapted to draw the core downwardly upon the movement of the bell crank lever in an upward direction, and to seat the core in operative position with the flange thereof in contact with the base plate when said lever is moved in the opposite direction. The toggle links, when the core is thus seated, will be in alinement with each other and the core will be firmly locked against displacement until the above crank lever is moved upwardly. The upper surface of the base member is suitably channeled to provide runners and gates, as will be presently described.

The cope portion of the mold comprises four hinged sections 21, 22, 23, 24, formed of metal, each section preferably having vertical walls adapted to meet and tightly fit against like walls of companion sections along each of the respective four vertical parting planes of said mold sections. The central vertical portion of each movable section is suitably shaped to provide one fourth of the casting cavity 25 for the article to be cast, in this instance, a piston, and the vertical walls merge at their lower edges with a base section 26 adapted to rest on the base plate of the apparatus. The movable sections are adapted to be swung outwardly on their respective hinges 27 provided on the base plate and at their outer central lower edges. Means for moving the respective movable sections outwardly and inwardly is provided, such means being shown in the drawings, as a socket 28 within which a suitable bar may be engaged to move each of said sections. The outer position of the movable sections permits the free removal of the casting in an upward direction, and a slight tapping adjacent the web-like gates will at once free the casting from the excess gate metal and associated sprues and runners, as will be presently described.

The manner of introducing the metal into the mold may be varied to some extent, but the form illustrated discloses a vertical sprue passageway 31 extending downwardly at a slight inward inclination and communicating at its lower end with a radially positioned recess 32 formed in the base plate and extending inwardly toward the casting cavity but terminating in spaced relation thereto. At a point intermediate the position of the lower end of the sprue cavity and the casting cavity adjacent thereto, an upwardly extending runner cavity 33 is formed in the mold faces, said runner cavity terminating at its upper end in a riser cavity 34 above the casting cavity and at its lower end communicating with the radially positioned recess 32. A thin gate 35 is formed in the meeting mold faces between the upwardly extending runner cavity and the casting cavity, said gate being of very narrow width and permitting so small a mass of metal to be held therein that when the flow of metal therethrough has stopped, it will solidify in advance of the metal in the casting cavity and form a seal between said metal and the molten metal supply in the vertical runner cavity. The gate, at its upper and lower ends, preferably terminates short of the vertical extent of the casting cavity, but in certain forms of construction presently to be described, the gate may extend the full length of the casting cavity in a vertical direction.

The lower end of the sprue cavity 31 communicates not only with the radial recess 32, but with arc-shaped runner passageways preferably formed in the base plate and extending in spaced peripheral relation to the bottom of the casting cavity. One of said runner cavities 36, as shown in Figure 2, extends to a point slightly beyond the midsection of the adjacent movable mold section and enters the casting cavity through a thin gate 37 similar in its action to the gate 35 heretofore described. The other arcuate shaped runner cavity may correspond exactly with the runner cavity 36 when a sprue cavity and vertical runner cavity is to be used in each parting plane of the movable mold members, but in the form of construction illustrated, the metal is poured into the mold through two sprue cavities which are positioned on opposite sides of the mold cavity, and the movable mold faces at the intermediate parting planes are provided with vertical runner cavities 38, each of which communicates with the casting cavity through thin gates 41 similar to the gate 35 heretofore described. The vertical runner cavity 38 communicates at its upper end with the riser cavity 34 heretofore mentioned and at its lower end with the arcuate runner cavity 42 which is positioned opposite the runner cavity 36 heretofore described. The runner cavity 42 extends slightly beyond the intermediate parting planes of the adjacent movable mold sections and serves to supply the molten metal to the vertical runner cavity 38 at its lower end. A horizontal gate 43 connects the intermediate portion of the arcuate runner cavity 42 with the casting cavity adjacent the base of the casting cavity. Sprues and runners are provided for in the opposite portion of the movable mold sections complementary to those just described through the formation of like passageways in the base and associated movable mold sections, as is clearly shown in Figure 2, and gates are provided from each of said passageways in like manner.

The riser cavity 34 with which the vertical runner cavities 33 communicate at their upper ends is in the form of a Greek cross as seen from above and the sides bevel inwardly below to afford clearance for the adjacent margins of the movable mold sections and to provide relatively thin gate connections 44 with the piston head portion of the casting cavity. The gates 44 at the top of the piston mold cavity may be frangible thin webs when the thickness of metal in the head of the piston is relatively small, but where a very heavy head is to be provided, the connection web apertures may be increased in width over the piston head, or additional lateral gates to the piston head cavity may be provided.

In order to supply abundant molten metal to the vertical runner cavity 33, a branch feeder passageway 45, or a plurality of such passageways, may be provided between the sprue cavity 31 and said runner cavity 33.

The horizontal runner passageways in the base plate are preferably formed wholly in the base plate, as shown, but, if desired, may be formed partially in the base plate and partially in the movable mold sections.

The movable mold sections are locked in operative position by means of pivoted hooks 46 of conventional form on one section engaging over pins 47 (see Figures 1 and 7) on an adjacent section near the upper outer edges of the meeting side walls of the respective sections. Suitable hardened registering blocks 48 engaging notches 49 may be used to insure radial control of the position of the respective movable mold members.

The movable core member, where the casting is a piston, may comprise separable collapsible permanent cores, or, as shown in the drawings, may be formed as semi-permanent cores, wherein the upper baked sand or composition core 50 is seated above the retractible core 3 on a positioning lug 51 and held from floating by engagement with the inner ends of the core pins 52 for the wrist pin apertures in the wrist pin bosses 53, which are preferably supported in sockets 54 approximately centrally of two of the opposite movable mold sections 21 and 23. Said core pins may be drawn outwardly before the mold sections are opened after the casting is poured by means of suitable extensions 55 at the ends thereof, and shoulders 58 limit the inward movement of the core pins.

The movable core member 3, as shown in Figure 1, is provided with a keyway 56 engaging a key 57 secured to the wall of an aperture 60 through the base plate 2 to maintain the same against rotation.

The piston casting, when taken from the mold will exhibit a relatively thin-walled skirt section 61 and a relatively heavy head section 62 with a riser 63 in the form of a Greek cross attached to the head and connected with vertical runners 65, connected with the cylindrical piston by the gates 66 terminating at their lower ends in horizontal runners 67, 68, on each of the respective sides. The runners 68 are connected with the lower periphery of the piston by means of thin readily frangible webs 69. Companion runners 71 with similar gates 72 are positioned opposite each of the runners 68 and gates 69. Each of the sprues 64 at its lower end connects at a common meeting point with its associated set of runners 67, 68, and 71. The gate webs 73, as shown in detail in Figure 5, preferably are very thin and are narrowest at a point slightly spaced from the casting cavity and may have slightly beveled faces 74, on the line of merger with the casting wall.

In place of using two sprues for a mold of the general type just described, a construction such as is shown in Figure 6 may be used, wherein a sprue cavity 81 is provided in each parting plane of the movable mold members, which sprue cavity is connected with the casting cavity by a thin gate 82 and has two short horizontal arcuate runners 83 spaced from the base of the casting cavity and connected therewith by means of thin gates 84. The metal flows upwardly through thin gates 70 from the casting cavity into the cavity forming the riser 63. such cavity venting through the parting planes thereabove.

The form of construction shown in Figures 7 to 10 inclusive is similar in many respects to that heretofore described with the exception of the fact that the piston instead of being cast with the head portion upwardly is cast with the head portion downwardly.

The casting apparatus comprises a base plate 85 carried on a supporting structure 86 and having movable mold sections 87 connected by hinges 88 with said base plate and adapted to be moved upwardly into operative position. Each movable mold section meets its companion section in a vertical parting plane 91, 92, spaced at 90° intervals about the casting cavity 93 intermediate said mold sections and base. Each movable mold section has a horizontal section 94 adapted to overlie the base member and complete the runner passageway formed in said base member. Two oppositely movable mold sections are provided with sockets 95 in which core pins 96 for the wrist pin apertures and wrist pin bosses 97 are supported.

In the form of construction illustrated, two pouring sprue cavities 101 are provided in the meeting faces of the movable mold sections of the aligned parting planes 92, which cavities at their lower ends communicate with a radial recess 102 spaced from the casting cavity, from the inner end of which a vertical runner cavity 103 is provided in the meeting faces of the parting planes 92, said cavity being of reduced dimensions above the level of the casting cavity, and preferably open at its upper end. At a point opposite the casting cavity, the vertical runner cavity is connected with the casting cavity through slightly less than its full extent by means of a thin web-like gate 104. At an intermediate point the feeder passageway 105 may be provided to supply additional metal to the vertical runner cavity. At the point where the vertical sprue cavity communicates with a recess in the base member a pair of laterally directed runner passageways 106, 107, are provided, the passageway 106 communicating with the casting cavity through a narrow gate 108 spaced slightly from its end and the runner cavity 107 communicating with the casting cavity through a plurality of gates 111, 112. In the parting planes 91 intermediate the parting planes 92 having the sprue passageways, vertical runner passageways 113 (see Figure 8) are provided which are connected by narrow gates 114 of a like extent to the gates 104, in the parting planes 92 at right angles to the parting planes 91, said runner passageways being likewise reduced in dimension adjacent their upper ends which are open and communicating at their lower ends in each instance with the laterally directed runner passageways 107.

The mold, as illustrated, is for casting a piston in head down position and a metal core member 115 is provided to engage within the space between the movable mold members, said core member having a key 116 engaging a keyway 117 in one of said movable mold members to prevent rotation thereof. Said metal core member is provided with a central aperture through which a bolt 118 extends, said bolt securing a composition core 119 to the lower end of the metal core member. The wrist pin bosses are formed partially in the composition core member and partially in the metal core member and the wrist pin cores serve to assist in positioning the core members through engagement with a recess 121 at their inner ends. Sockets 122 are provided in each of the movable mold sections to permit the insertion of bars to move the same into open and closed position. The casting formed in the mold just described is shown in Figures 9 and 10, wherein the piston 123 is formed with wrist pin bosses 124 and a head section 125. The casting as taken from the mold carries the sprues 126, the radial runner 127, the lateral runners 128 and 129 having gate webs 131, 132 and 133, and having vertical runners 134 and 135 connected respectively to radial runners 127 and the lateral runners 129. Feeder webs 136 connect the sprues and vertical runners 134 and thin gates 137 and 138 connect the vertical runners 134 and 135, respectively, with the surface of the piston along vertical lines at ninety degree intervals about its cylindrical outer surface.

In the form of construction shown in Figures 11 to 14 inclusive, the molten metal is supplied to the mold solely through vertical gates entering the casting cavity at equally spaced intervals about its circumference.

The lower portion of the mold is similar in construction to that shown in Figures 1 to 4 inclusive, and similar reference characters have been applied thereto. The upper portion of the mold comprises eight movable mold members 141, each provided with a hinge 142 and in the form illustrated every alternate parting plane between each movable mold being provided in the adjacent faces with a sprue cavity 143 communicating with a radial recess 144 in the top of the base member, which extends to a point slightly spaced from the casting cavity 145. A circular runner cavity 146 extends around the cylindrical casting cavity, the inner margin of which runner cavity is positioned slightly outwardly from the casting cavity and at each of the parting planes of the movable mold sections a vertical runner cavity 147 is provided, said cavity extending upwardly to a point somewhat above the casting cavity to provide a riser chamber at its upper end which may be vented by scratches 149, comprising venting grooves formed by scratching the smooth surface of a mold section at the parting planes in the usual manner, if desired. Each of the eight vertical runner passageways is connected with the casting cavity by a thin gate 148, which preferably extends the full length of the casting cavity. Scratches 150 likewise may be provided above the casting cavity.

The method of positioning the composition core member 151 above the metal core member is similar to that employed in the construction shown in Figures 1 to 4, inclusive, said composition core member being seated upon a lug centrally of the metal core member and being held in position by the inner ends of the core pin 152 engaged through sockets 153 in two opposite movable mold members. Holes 160 for gas escape may be formed through the top of the metal core members.

Figures 11, 13:
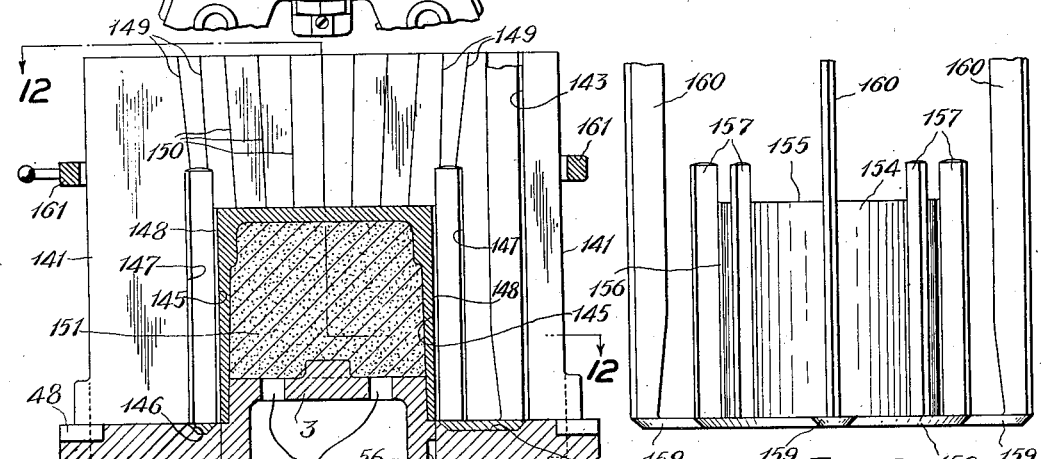
Figure 11 is a vertical sectional view of a modified form of mold construction embodying a plurality of thin vertical gates, taken along the line 11—11, shown in Figure 12, looking in the direction of the arrows.
Figure 13 is an elevation of the casting produced in a mold corresponding to Figures 11 and 12.

The casting formed in the mold just described is shown in Figures 13 and 14, the piston having a skirt section 154 and a head section 155 with thin gate webs 156 connecting the cylindrical outer surface of the piston to the vertical runners 157, which at their lower ends are connected to the circular runner 158 having at four equally spaced intervals about its circumference the radial extensions 159 with the outer portion of each of which a sprue 160 is connected at its lower end.

The movable mold sections in the form of construction just described may be secured to each other by means of hooks and pins as in the structure shown in Figures 1 to 4 inclusive, or they may be firmly secured to each other by means of C-clamps 161 (see Figures 11 and 12) adapted to engage over the side wall margins and tightened into firm clamping relation therewith.

The construction shown in Figures 15 to 19, inclusive, supplies molten metal to the casting cavity solely through circumferentially disposed horizontal gates.

The lower portion of the mold is similar in construction to that shown in Figures 1 to 4, inclusive, and similar reference characters have been applied thereto. The upper portion of the mold comprises four movable mold members 162, each provided with a hinge 163, and in the form illustrated, each parting plane between each movable mold section is provided in the adjacent faces with a sprue cavity 164, communicating with a radial recess 165 in the top of the base member which extends to a point slightly spaced from the casting cavity 166. An arc shaped runner cavity 167 extends in a clockwise direction from each radial recess in outwardly spaced relation to the base of the casting cavity and short of its end is connected by a thin gate 168 with the lower outer wall of the article to be formed in the casting cavity. In each parting plane in alignment with the sprue passageway, a vertical runner passageway 169 is provided extending upwardly from the inner portion of the radial recess and being open at its upper end. The sprue passageway may be connected with the vertical runner passageway by means of a feeder passageway 171 positioned approximately at the midheight of the casting cavity and extending in a slightly upward direction. The vertical runner passageways have no vertical gates connecting with the casting cavity, as in the forms of construction previously described, but in a plane adjacent the top of the casting cavity intersect a circular runner passageway 172 inclined slightly downwardly and communicating with the casting cavity through a thin circumferential gate 173. At the top of the casting cavity a riser cavity is provided in the form of a Greek cross similar to that shown in Figures 1 to 4, said riser cavity 174 being formed in separately hinged upper portions 175 of the movable mold members. The provision of two sets of hinges for the movable mold members permits the use of a circumferential runner at an elevated point about the outer circumference of a piston and the gate may be placed along a circumferential line where a groove for a piston ring is to be cut and thus a single machining operation can remove the excess gate metal and form a groove at the point referred to. The hinges 176 are provided with stops 177 on one hinge member so that the upper portion of the movable mold may be swung outwardly before any motion is imparted to the lower portion thereof. The means for moving the upper portions of the movable mold members may comprise a socket 178 within which a bar 179 may be engaged and a like socket 181 adapted to be engaged by a bar 182 may be provided in the lower portion of the movable mold sections. The lower portion of the movable mold section after the withdrawal of the core pins 183 from the section supplied therewith, after the manner described in connection with the other forms of apparatus, may be moved outwardly without interference with the circumferential runner 172 because of the position of the pivots of such lower mold sections. The movable mold sections may be provided with separate clamping hooks 183 and 184 of conventional form for the respective upper and lower portions engaging over pins 185 and 186, respectively, as is shown in Figure 15.

Figures 17, 18, and 19 show the casting formed in the apparatus just described, said casting comprising a piston body having a skirt portion 187 and a head portion 188 with a riser 189 in the form of a Greek cross connected to the head by thin gate webs 191 and 192 and having a circumferential runner 193 connected with the upper cylindrical portion by thin circumferential gate web 194 and having the skirt portion connected adjacent its lower outer cylindrical portion by means of thin gate webs 195 with arcuate runners 196, which arcuate runners have radial extensions 197 from which sprues 198 and vertical runners 199 extend upwardly, said sprues and runners being connected at an intermediate point by feeder webs 201, and said vertical runners intersecting at an intermediate point of their extent the outer portions of the circular runner 193.

Through the use of thin gates, in the various types of casting apparatus above described, as well as various other embodiments of the invention incorporating specific features disclosed, it is possible to produce certain specific articles, such as pistons for automobiles formed of aluminum or aluminum alloys or like metals having low melting point and high crystallization shrinkage, in such manner that when the metal in the casting cavity commences to solidify, the metal in the gates opposite such metal in the casting cavity will already have solidified and isolated the metal of the casting cavity from the metal supply in the runners on the opposite sides of said gates. In this manner, no shrinkage losses are made up from the metal in the adjacent runner passageways and the metal in the casting cavity solidifies unaffected by interchange of metal through the gates at such points, which might otherwise introduce imperfections and irregularities in the surface of the casting.

It is not intended, however, to limit the scope of the invention to thin gates where the combinations set forth in the claims are not so limited, as for some special purposes it may be desired that some of the gates be of more than web-like thickness, or where riser cavities are desired with gates of larger width, or where both horizontal and vertical gates are employed in a single casting and where the horizontal gates are to be thin and the vertical gates of larger dimension, or vice versa.

Other modes of applying the principle of the invention may be employed instead of the modes herein explained, change being made as regards the means and steps herein disclosed and the product resulting therefrom, provided those stated by any one of the following claims or their equivalent be employed or embodied therein.

I therefore particularly point out and distinctly claim as my invention:

1. The process of casting substantially cylindrical articles from metals and alloys, which comprises the steps of pouring the metal downward under the action of gravity toward the bottom of the casting cavity, and thence upwardly in the form of a substantially vertical runner, and directing a portion of the metal from the lower portion of said downward flowing metal, outwardly in the form of a substantially horizontal arc-shaped stream spaced outwardly from the lower periphery of the casting cavity, and directing another portion of the metal from the upper portion of the vertical runner in a substantially horizontal arc-shaped stream spaced from the adjacent casting cavity, and directing metal from each of said arc-shaped streams into the casting cavity in the form of a substantially horizontal thin web, each of said webs comprising such a small mass of metal that when the metal flow into the casting cavity at the position of each respective web has stopped, the metal of said web will solidify in advance of the metal in the casting cavity and form a seal between the metal of each respective arc-shaped stream and the metal in the casting cavity.

2. The process of casting substantially cylindrical articles from metals and alloys, which comprises the steps of pouring the metal downward under the action of gravity toward the bottom of a cylindrical casting cavity in the form of a plurality of downwardly directed streams, directing it laterally in the form of an annular stream in spaced relation to the lower portion of the casting cavity, and thence upwardly in the form of a substantially vertical runner, and directing a portion of the metal from the lower portion of said downward flowing metal, outwardly in the form of an annular stream spaced from the lower periphery of the casting cavity, and directing another portion of the metal from the upper portion of the vertical runner in an annular stream spaced outwardly from the adjacent casting cavity, and directing metal from each of said annular streams into the casting cavity in the form of a substantially horizontal thin annular web, each of said webs comprising such a small mass of metal that when the metal flow into the casting cavity at the position of each respective web has stopped, the metal of said web will solidify in advance of the metal in the casting cavity and form a seal between the metal of each respective annular stream and the metal in the casting cavity.

3. A casting apparatus having in combination a metal base member, a plurality of movable metal mold members supported thereon and each having faces abutting with said base member and companion movable mold members, a cylindrical casting cavity formed intermediate said base and movable mold members, a pouring sprue cavity formed in at least one vertical parting plane of said movable mold sections, at least one horizontal runner cavity formed at the horizontal parting plane of the movable mold sections and said base member communicating with said pouring sprue cavity, at least one vertical runner cavity extending upwardly from said horizontal runner cavity, an annular horizontal runner cavity in spaced relation to the upper portion of said cylindrical casting cavity intersected and supplied with molten metal by at least one vertical runner cavity, and a thin web-like circumferential gate connecting said annular horizontal runner cavity with said cylindrical casting cavity along a horizontal circumferential line of contact with the cylindrical surface of the article to be formed in said casting cavity, said gate being so narrow that the molten metal therein when the metal flow through said gate has stopped, will solidify in advance of the metal in the casting cavity and of the metal in the adjacent annular horizontal runner cavity.

4. A casting apparatus having in combination a metal base member, a plurality of movable metal mold members supported thereon and each having faces abutting with said base member and companion movable mold members, a cylindrical casting cavity formed intermediate said base and movable mold members, a cylindrical core movable through an aperture in said base member into the casting cavity in spaced relation to the walls thereof, a pouring sprue cavity formed in at least one vertical parting plane of said movable mold sections, at least one horizontal runner cavity formed at the horizontal parting plane of the movable mold sections and said base member communicating with said pouring sprue cavity, at least one vertical runner cavity extending upwardly from said horizontal runner cavity, an annular horizontal runner cavity in spaced relation to the upper portion of said cylindrical casting cavity intersected and supplied with molten metal by at least one vertical runner cavity, and a thin web-like circumferential gate connecting said annular horizontal runner cavity with said cylindrical casting cavity along a horizontal circumferential line of contact with the cylindrical surface of the article to be formed in said casting cavity, said gate being so narrow that the molten metal therein when the metal flow through said gate has stopped, will solidify in advance of the metal in the casting cavity and of the metal in the adjacent annular horizontal runner cavity.

5. A casting apparatus having in combination a metal base member, a plurality of movable metal mold members supported thereon and each having faces abutting with said base member and companion movable mold members, a cylindrical casting cavity formed intermediate said base and movable mold members, a riser cavity above said casting cavity, thin gates connecting said riser cavity with the top of said casting cavity, a cylindrical core movable through an aperture in said base member into the casting cavity in spaced relation to the walls thereof, a pouring sprue cavity formed in at least one vertical parting plane of said movable mold sections, at least one horizontal runner cavity formed at the horizontal parting plane of the movable mold sections and said base member communicating with said pouring sprue cavity, at least one vertical runner cavity extending upwardly from said horizontal runner cavity, an annular horizontal runner cavity in spaced relation to the upper portion of said cylindrical casting cavity intersected and supplied with molten metal by at least one vertical runner cavity, and a thin web-like circumferential gate connecting said annular horizontal runner cavity with said cylindrical casting cavity along a horizontal circumferential line of contact with the cylindrical surface of the article to be formed in said casting cavity, said gate being so narrow that the molten metal therein when the metal flow through said gate has stopped, will solidify in advance of the metal in the casting cavity and of the metal in the adjacent annular horizontal runner cavity.

6. A casting apparatus having in combination a metal base member, a plurality of movable hinged and centrally jointed metal mold members supported thereon and each having faces abutting with said base member and companion movable mold members, a cylindrical casting cavity formed intermediate said base and movable mold members, a cylindrical core movable through an aperture in said base member into the casting cavity in spaced relation to the walls thereof, a pouring sprue cavity formed in at least one vertical parting plane of said movable mold sections, at least one horizontal runner cavity formed at the horizontal parting plane of the movable mold sections and said base member communicating with said pouring sprue cavity, at least one vertical runner cavity extending upwardly from said horizontal runner cavity, an annular horizontal runner cavity in the parting plane of the central joint of said movable mold members and in spaced relation to the upper portion of said cylindrical casting cavity intersected and supplied with molten metal by at least one vertical runner cavity, and a thin web-like circumferential gate connecting said annular horizontal runner cavity with said cylindrical casting cavity along a horizontal circumferential line of contact with the cylindrical surface of the article to be formed in said casting cavity, said gate being so narrow that the molten metal therein when the metal flow through said gate has stopped, will solidify in advance of the metal in the casting cavity and of the metal in the adjacent annular horizontal runner cavity.

7. A casting apparatus having in combination a metal base member, a plurality of movable hinged and centrally jointed metal mold members supported thereon and each having faces abutting the said base member and companion movable mold members, a cylindrical casting cavity formed intermediate said base and movable mold members, a cylindrical core movable through an aperture in said base member into the casting cavity in spaced relation to the walls thereof, a pouring sprue cavity formed in at least one vertical parting plane of said movable mold sections, an annular horizontal runner cavity in the parting plane of the central joint of said movable mold members and in spaced relation to the upper portion of said cylindrical casting cavity intersected and supplied with molten metal by at least one vertical runner cavity, communicating with the sprue cavity, and a thin web-like circumferential gate connecting said annular horizontal runner cavity with said cylindrical casting cavity along a horizontal circumferential line of contact with the cylindrical surface of the article to be formed in said casting cavity, said gate being so narrow that the molten metal therein when the metal flow through said gate has stopped, will solidify in advance of the metal in the casting cavity and of the metal in the adjacent annular horizontal runner cavity.

WILLIAM J. WESSELER.